United States Patent
Nomura et al.

[11] Patent Number: 5,115,774
[45] Date of Patent: May 26, 1992

[54] INTERNAL COMBUSTION ENGINE

[75] Inventors: Hiroshi Nomura, Susono; Norihiko Nakamura; Kenichi Nomura, both of Mishima; Tatsuo Kobayashi; Hiroaki Nihei, both of Susono, all of Japan

[73] Assignee: Toyota Jidosha Kabushiki Kaisha, Aichi, Japan

[21] Appl. No.: 736,692

[22] Filed: Jul. 26, 1991

[30] Foreign Application Priority Data

Dec. 26, 1990 [JP] Japan .................. 2-406794
Dec. 26, 1990 [JP] Japan .................. 2-406817

[51] Int. Cl.⁵ .............................. F02B 19/10
[52] U.S. Cl. ................... 123/276; 123/260; 123/302; 123/533; 123/661
[58] Field of Search ........... 123/260, 261, 262, 263, 123/276, 279, 302, 305, 531, 532, 533, 534, 661

[56] References Cited

U.S. PATENT DOCUMENTS

| | | | |
|---|---|---|---|
| 3,498,276 | 3/1970 | Hardenberg | 123/276 |
| 4,492,194 | 1/1985 | Chmela et al. | 123/276 |
| 4,840,147 | 6/1989 | Tanahashi et al. | 123/65 VD |
| 4,920,937 | 5/1990 | Sasaki et al. | 123/260 X |
| 4,958,604 | 9/1990 | Hashimoto | 123/276 |

FOREIGN PATENT DOCUMENTS

| | | | |
|---|---|---|---|
| 0251983 | 7/1911 | Fed. Rep. of Germany | 123/276 |
| 0842283 | 5/1952 | Fed. Rep. of Germany | 123/276 |
| 0334207 | 1/1936 | Italy | 123/276 |
| 61-173728 | 10/1986 | Japan . | |
| 63-40527 | 3/1988 | Japan . | |
| 1-124042 | 8/1989 | Japan . | |
| 1-203613 | 8/1989 | Japan . | |
| 2-16360 | 1/1990 | Japan . | |
| 2-169834 | 6/1990 | Japan . | |
| 723972 | 2/1955 | United Kingdom . | |

Primary Examiner—Willis R. Wolfe
Attorney, Agent, or Firm—Oliff & Berridge

[57] ABSTRACT

An internal combustion engine having an air blast valve which injects fuel together with pressurized air in the form of a conical shaped spray of fuel. A depression is formed on the top face of the piston, and the conical shaped spray of fuel is injected from the air blast valve toward the depression. The longitudinal width of the depression in the moving direction of the spray of fuel is larger than the transverse width of the depression in the direction perpendicular to the moving direction of the spray of fuel, and the opposing side walls of the depression, which define the transverse width of the depression, are positioned slightly outward from the side face of the conical shaped spray of fuel.

11 Claims, 4 Drawing Sheets

1

INTERNAL COMBUSTION ENGINE

BACKGROUND OF THE INVENTION

1. Field of the Invention

The present invention relates to an internal combustion engine.

2. Description of the Related Art

In a known engine in which fuel is directly injected into the cylinder of the engine, a depression is formed on the top face of the piston, fuel is injected from the fuel injector toward the depression, a swirl motion, swirling about the axis of the cylinder, is created in the combustion chamber, and an ignitable air-fuel mixture is formed around the spark plug due to the swirl motion (see Japanese Unexamined Utility Model application No. 1-124042).

In this engine, however, such a swirl motion swirling about the axis of the cylinder must be created, and therefore, where such a swirl motion cannot be created, the method of forming the air-fuel mixture around the spark plug by using the swirl motion can no longer be adopted. Further, in this engine, the strength of the swirl motion is changed in accordance with a change of the operating state of the engine. Therefore, if the formation of the air-fuel mixture around the spark plug relies completely on the swirl motion, a problem arises in that it is difficult to create a proper air-fuel mixture around the spark plug for all of the operating states of the engine.

SUMMARY OF THE INVENTION

An object of the present invention is to provide an engine capable of forming a proper air-fuel mixture around the spark plug, regardless of the load under which the engine is running.

Therefore, according to the present invention, there is provided an internal combustion engine comprising: a cylinder head having an inner wall; a spark plug arranged at a central portion of the inner wall of the cylinder head; an air blast valve arranged on a peripheral portion of the inner wall of the cylinder head; and a piston having a top face having a depression extending from a point beneath the spark plug to a point beneath a tip portion of the air blast valve, the air blast valve injecting fuel together with pressurized air toward the depression, in the form of a conical shaped spray of fuel, at the compression stroke of the engine to thus direct the conical shaped spray of fuel toward the depression beneath the spark plug along a bottom wall of the depression, a longitudinal width of the depression in the moving direction of the conical shaped spray of fuel being larger than a transverse width of the depression in the direction perpendicular to the moving direction of the conical shaped spray of fuel, opposing side walls of the depression, which define the transverse width, being positioned slightly outward from a side face of the conical shaped spray of fuel.

The present invention may be more fully understood from the description of a preferred embodiment of the invention set forth below, together with the accompanying drawings.

DESCRIPTION OF THE PREFERRED EMBODIMENT

Figure 1:
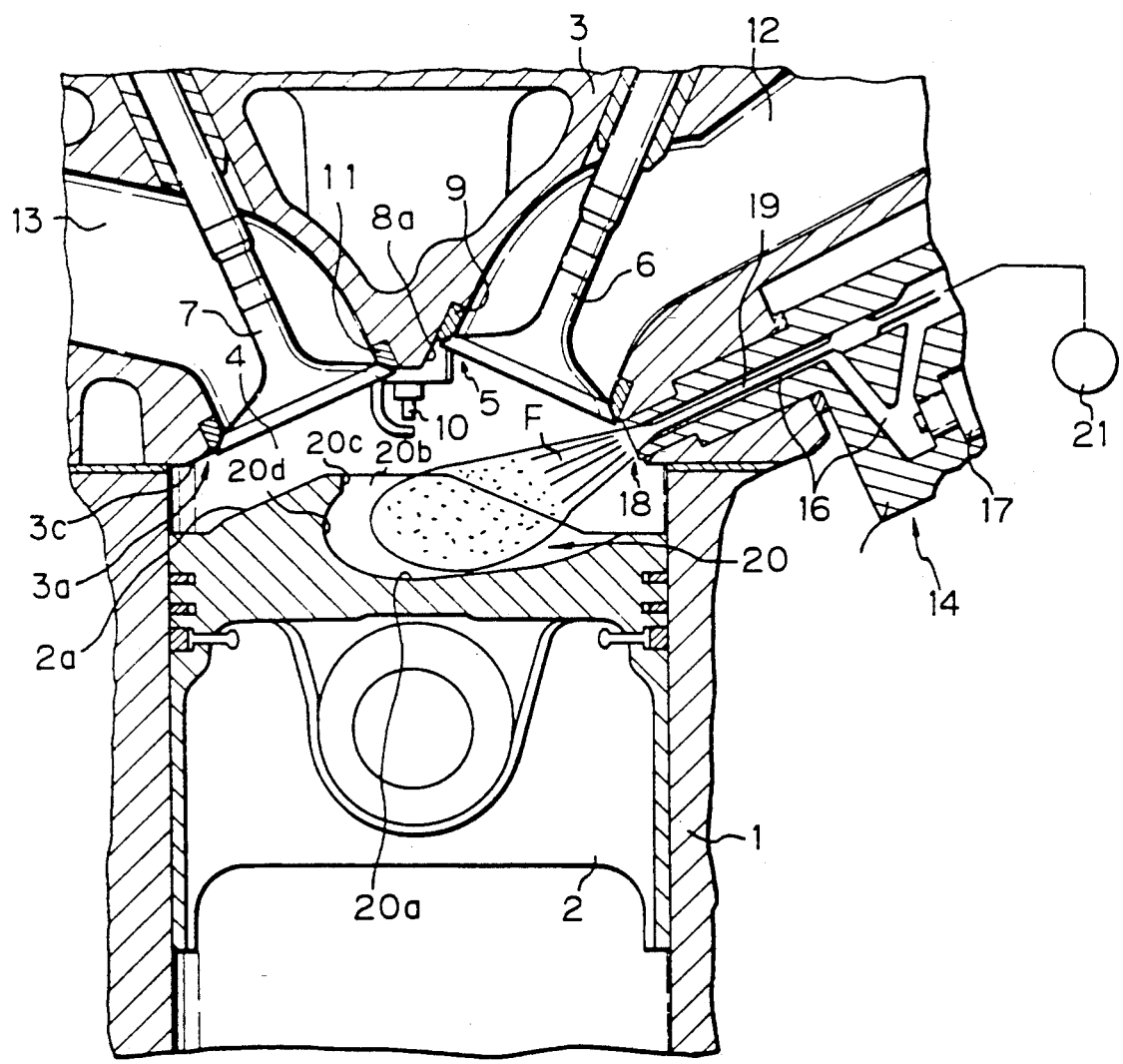
FIG. 1 is a cross-sectional side view of a two-stroke engine.
Figure 2:
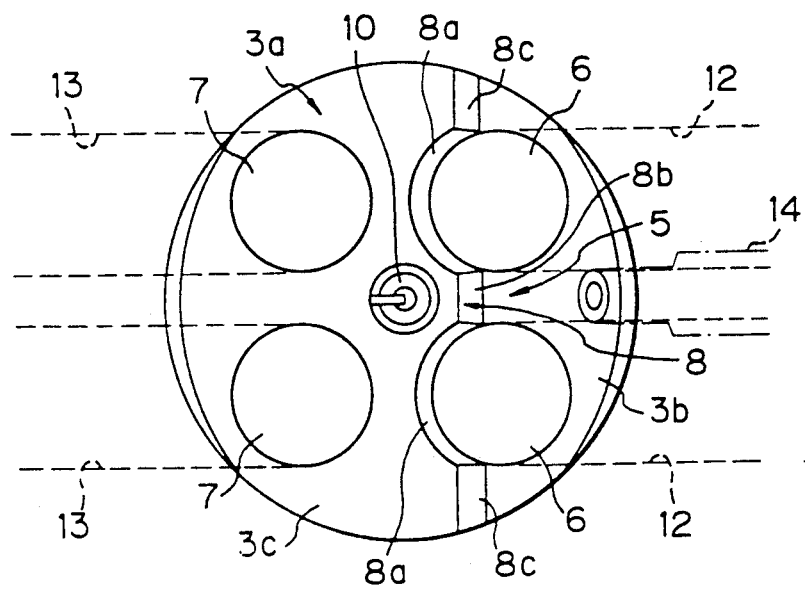
FIG. 2 is a view illustrating an inner wall of a cylinder head.

Referring to FIGS. 1 and 2, reference numeral 1 designates a cylinder block, 2 a piston reciprocally movable in the cylinder block 1, 3 a cylinder head fixed onto the cylinder block 1, and 4 a combustion chamber formed between the inner wall 3a of the cylinder head 3 and the top face of the piston 2. A depression 5 is formed on the inner wall 3a of the cylinder head 3, and a pair of intake valves 6 are arranged on the inner wall portion 3b of the cylinder head 3, which forms the bottom wall of the depression 5. The inner wall portion 3c of the cylinder head 3 other than the depression 5 is substantially flat and inclined, and a pair of exhaust valves 7 are arranged on this inner wall portion 3c of the cylinder head 3. The inner wall portions 3b and 3c of the cylinder head 3 are interconnected via the peripheral wall 8 of the depression 5. The peripheral wall 8 of the depression 5 comprises masking walls 8a arranged as close as possible to the peripheral portions of the corresponding intake valves 6 and extending archwise along the periphery of the corresponding intake valves 6, a fresh air guide wall 8b arranged between the intake valves 6, and fresh air guide walls 8c each arranged between the circumferential wall of the inner wall 3a of the cylinder head 3 and the corresponding intake valve 6. The masking walls 8a extend toward the combustion chamber 4 to a position lower than the intake valves 6 when the valves 6 are in the maximum lift position, and thus the valve opening between the valve seat 9 and the peripheral portion of the intake valve 6, which is located on the exhaust valve side, is masked by the corresponding masking wall 8a for the entire time for which the intake valve 6 is open. The fresh air guide wall 8b and the fresh air guide walls 8c are located on substantially the same plane and extend substantially in parallel to the line passing through the centers of the intake valves 6. The spark plug 10 is arranged on the inner wall portion 3c of the cylinder head 3 in such a manner that it is located at the center of the inner wall 3a of the cylinder head 3. Further, a masking wall for masking the valve openings between the exhaust valves 7 and the valve seats 11 is not provided for the exhaust valves 7, and accordingly, when the exhaust valves 7 are open the entire valve openings formed between the exhaust valves 7 and the valve seats 11 are open to the combustion chamber 4.

Intake ports 12 are formed in the cylinder head 3 for the intake valves 6, and exhaust ports 13 are formed in the cylinder head 3 for the exhaust valves 7. An air blast valve 14 is arranged at the periphery of the inner wall 3a of the cylinder head 3, between the intake valves 6. This air blast valve 14 comprises a pressurized air passage 16 formed in a housing 15 thereof and connected to a pressurized air source 21, a fuel injection 17 arranged in the pressurized air passage 16, and a valve body 19 driven by a solenoid (not shown) to control the opening operation of a nozzle opening 18 arranged in the combustion chamber 4. The interior of the pressurized air passage 16 is always filled with pressurized air, and fuel is injected into the pressurized air in the pressurized air passage 16. After the fuel is injected, when the valve body 19 opens the nozzle opening 18, the fuel is injected into the combustion chamber 4 from the nozzle opening 18, together with the pressurized air.

Figure 3:
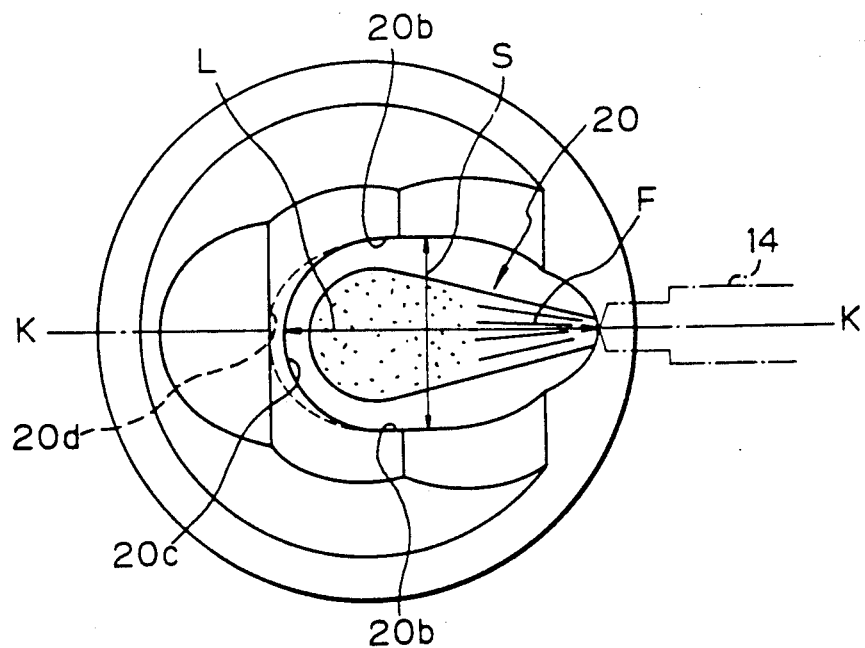
FIG. 3 is a plan view of a piston.

As illustrated in FIGS. 1 and 3, a depression 20 extending from a point beneath the spark plug 10 to a point beneath the tip portion of the air blast valve 14 is formed on the top face of the piston 2. In the embodiment illustrated in FIGS. 1 and 3, the depression 20 has a shape which is symmetrical with respect to the vertical plane K—K including the spark plug 10 and air blast valve 14.

Figure 4:
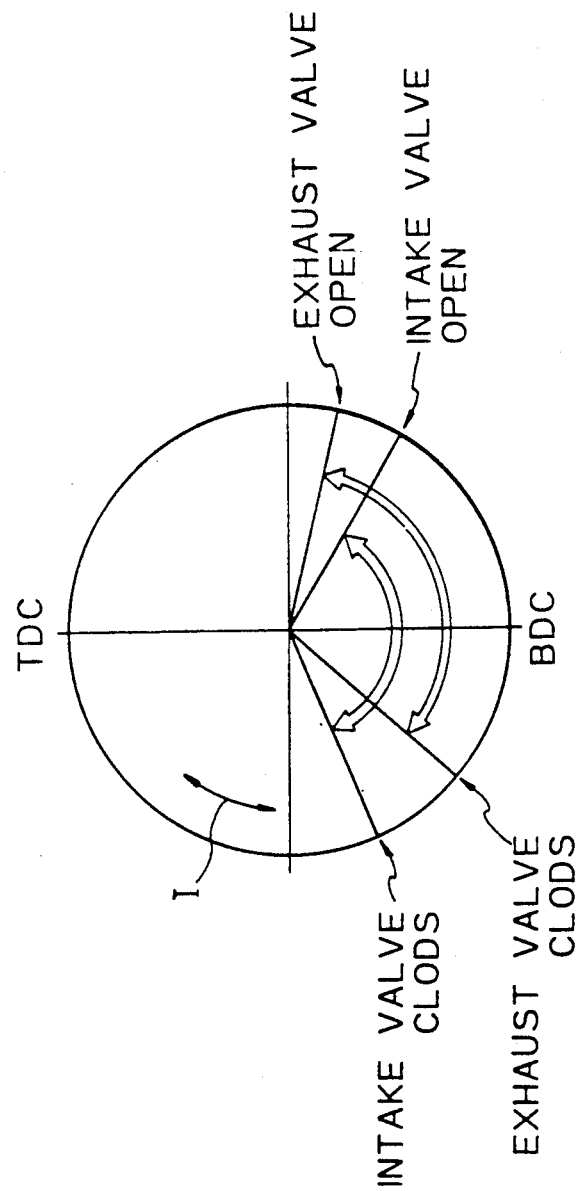
FIG. 4 is a diagram illustrating the opening time of an intake valve and an exhaust valve.

In the embodiment illustrated in FIGS. 1 through 3, as illustrated in FIG. 4, the exhaust valves 7 open earlier than the intake valves 6, and the exhaust valves 7 close earlier than the intake valves 6. In addition, in FIG. 4, I indicates the fuel injection time. Accordingly, as illustrated by F in FIGS. 1 and 3, at the second half of the compression stroke, fuel is injected, together with pressurized air, from the nozzle opening 18 of the air blast valve 14 in the form of a conically shaped spray of fuel. At this time, the spray of fuel F is injected from the nozzle opening 18 along the vertical plane K—K and directed toward the depression 20 beneath the spark plug 10, along the bottom wall 20a of the depression 20. As can be seen from FIG. 3, S of the depression 20 in the direction perpendicular to the axis of the fuel spray F, i.e., perpendicular to the vertical plane K—K, is narrower than the longitudinal width L of the depression 20 in the direction along the axis of the fuel spray, i.e., along the vertical plane K—K. In addition, the opposing side walls 20b of the depression 20, which define the transverse width S of the depression 20, are substantially vertically arranged and positioned slightly outward from the outer face of the fuel spray F. Furthermore, as illustrated in FIG. 3, the contour of the upper edge portion 20c of the depression 20, which portion is located opposite to the air blast valve 14, has an arc shape and, as illustrated in FIG. 1, a recessed portion 20d having an arc shaped cross-section and concave relative to the upper edge portion 20c in the direction opposite to the air blast valve 14 is formed on the end face of the depression 20, which extends upward from the bottom wall 20a of the depression 20 toward the spark plug 10 at a position opposite to the air blast valve 14. Accordingly, the upper portion of the depression 20 is formed into an inclined wall which faces downward. The top face portion 2a of the piston 2 positioned opposite to the depression 20 with respect to the upper edge portion 20c is substantially flat and inclined so that, when the piston 2 reaches TDC, a squish area is formed between the inner wall portion 3c of the cylinder head 3 and the top face portion 2a of the piston 2.

Next, the formation of an air-fuel mixture will be described with reference to FIG. 1, 3 and 5.

Figure 5:
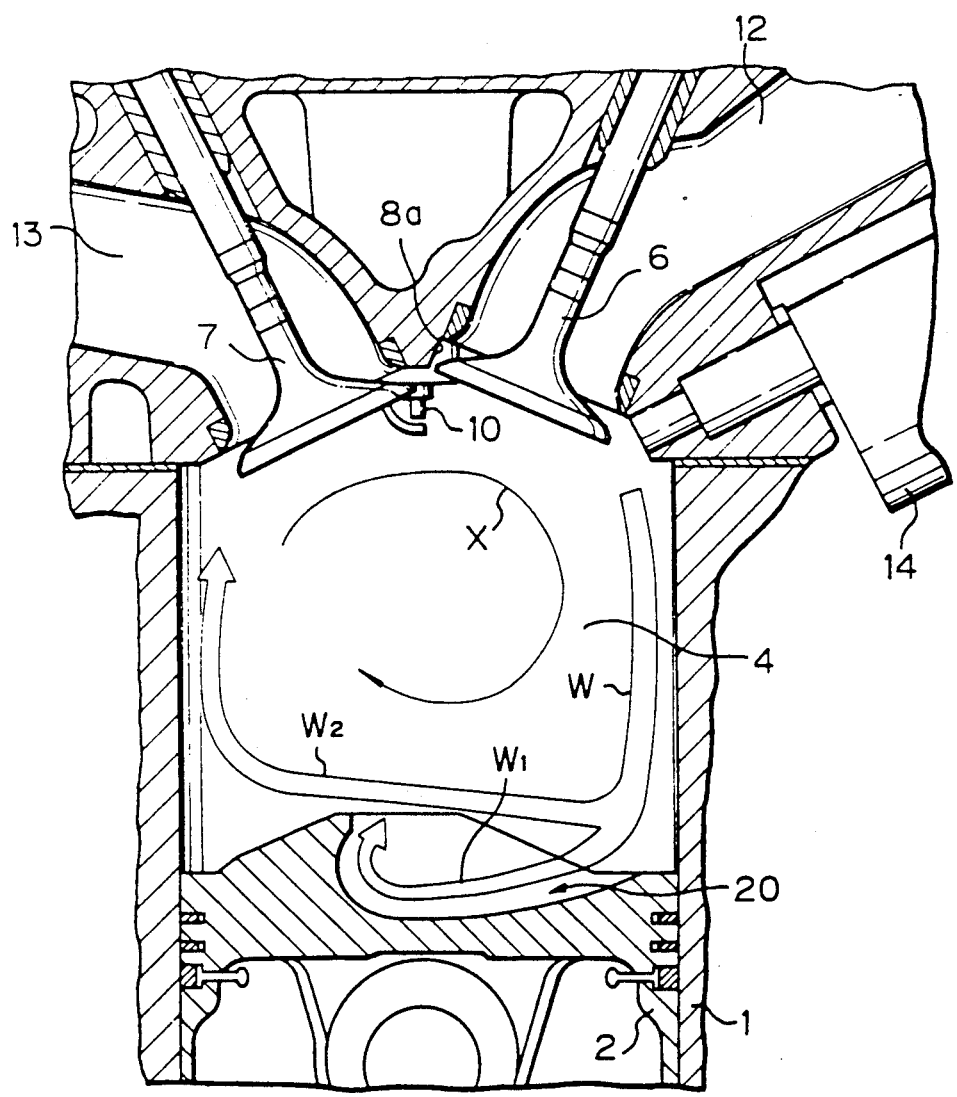
FIG. 5 is a cross-sectional side view of the engine, illustrating the operation thereof.

As illustrated in FIG. 5, when the intake valves 6 and the exhaust valves 7 are open, fresh air flows into the combustion chamber 4 via the intake valve 6. At this time, since the valve openings of the intake valves 6, which openings are located on the exhaust valve side, are masked by the masking walls 8a, the fresh air flows into the combustion chamber 4 from the valve openings of the intake valves 6, which openings are located on the opposite side of the masking walls 8a. Then, as illustrated by the arrow W in FIG. 5, the fresh air flows downward along the inner wall of the cylinder, located beneath the intake valves 6. Then, a part $W_1$ of the fresh air W flows into the depression 20, and thus the interior of the depression 20 is scavenged by the part of fresh air $W_1$. The remaining part $W_2$ of the fresh air W moves forward along the top face of the piston 2 and flows upward along the inner wall of the cylinder, located beneath the exhaust valves 7. Thus, the remaining art of the fresh air $W_2$ flows within the combustion chamber 4 in the form of a loop. The burned gas in the combustion chamber 4 is discharged via the exhaust valves 7 by the air stream $W_2$ flowing in the form of a loop manner, and a swirl motion X swirling in a vertical plane is created in the combustion chamber 4 by the air stream $W_2$ flowing in the form of a loop. Then, the piston 2 passes through the bottom dead center (BDC) and starts to move upward. Thereafter, the intake valves 6 and the exhaust valves 7 are closed and, when the end of the compression stroke approaches, the fuel spray F is injected from the air blast valve 14 toward the depression 20 beneath the spark plug 10, along the bottom wall 20a of the depression 20.

If fuel is injected by using pressurized air, since the fuel is properly divided into fine particles, the fuel spray F instantaneously becomes ignitable, but since the fuel spray F is gaseous, the fuel spray F easily spreads over all of the combustion chamber 4. Nevertheless, if the fuel spray F spreads over all of the combustion chamber 4, since it is thus impossible to collect a relatively rich air-fuel mixture around the spark plug 10, particularly when the engine is operating under a light load wherein the amount of the injected fuel is relatively small, a good ignition cannot be obtained.

In the embodiment illustrated in FIGS. 1 and 3, however, as mentioned above, the opposing side walls 20b of the depression 20, which define the transverse width S of the depression 20, are positioned slightly outward from the outer face of the conical shaped fuel spray F. Accordingly, the fuel spray F is ejected in such a manner that it flows between the opposing side walls 20b of the depression 20, and thus the fuel spray F cannot be dispersed in the lateral direction. Accordingly, an air-fuel mixture is collected in the depression 20 beneath the spark plug 10 and is ignited by the spark plug 10, and thus a good ignition by the spark plug 10 can be obtained.

In addition, as mentioned above, since the recessed portion 20d formed on the end face of the depression 20 is concave in the direction opposite to the air blast valve 14, the fuel spray F is captured by the recessed portion 20d, and thus is prevented from dispersing into the combustion chamber 4 beneath the exhaust valves 7 by the recessed portion 20d. Consequently, by forming the recessed portion 20d on the end face of the depression 20, it is possible to further collect an air-fuel mixture in the depression 20 beneath the spark plug 10.

Furthermore, as illustrated in FIG. 5, the swirl motion X is created in the combustion chamber 4, and the direction of movement of the fuel spray F is deflected toward the interior of the depression 20. Consequently, any dispersion of the air-fuel mixture is further prevented by the swirl motion X.

According to the present invention, where the air blast valve is used, even when the engine is operating under a light load wherein the amount of the injected fuel is small, it is possible to collect an ignitable air-fuel mixture around the spark plug, and thus a good ignition can be obtained.

While the invention has been described by reference to a specific embodiment chosen for purposes of illustration, it should be apparent that numerous modifications could be made thereto by those skilled in the art without departing from the basic concept and scope of the invention.

We claim:

1. An internal combustion engine comprising:
a cylinder head having an inner wall;
a spark plug arranged at a central portion of the inner wall of said cylinder head;
an air blast valve arranged on a peripheral portion of the inner wall of said cylinder head; and
a piston having a top face having a depression extending from a point beneath said spark plug to a point beneath a tip portion of said air blast valve, said air blast valve injecting fuel together with pressurized air toward said depression in the form of a conical shaped spray of fuel at the compression stroke of the engine to direct said conical shaped spray of fuel toward said depression beneath said spark plug along a bottom wall of said depression, a longitudinal width of said depression in the moving direction of said conical shaped spray of fuel being larger than a transverse width of said depression in the direction perpendicular to the moving direction of said conical shaped spray of fuel, opposing side walls of said depression, which define said transverse width, being positioned slightly outward from a side face of said conical shaped spray of fuel.

2. An internal combustion engine according to claim 1, wherein said depression has an end face extending upward from the bottom wall of said depression toward said spark plug, and a recessed portion concave relative to an upper edge portion of said end face in the direction opposite to said air blast valve is formed on said end face.

3. An internal combustion engine according to claim 2, wherein the upper edge portion of said end face has an arc shaped contour.

4. An internal combustion engine according to claim 2, wherein the opposing side walls of said depression extend substantially vertically.

5. An internal combustion engine according to claim 1, wherein said depression has a symmetrical shape with respect to a vertical plane including said spark plug and said air blast valve, and said conical spray of fuel is injected from said air blast valve along said vertical plane.

6. An internal combustion engine according to claim 5, further comprising: a pair of intake valves symmetrically arranged on the inner wall of said cylinder head with respect to said vertical plane; exhaust valve means arranged on the inner wall of said cylinder head; and a pair of masking walls each being formed on the inner wall of said cylinder head and arranged between said corresponding intake valve and said exhaust valve means to mask a valve opening formed between a valve seat and a peripheral portion of said corresponding intake valve, which is located on said exhaust valve means side, for the entire time for which said corresponding intake valve is open.

7. An internal combustion engine according to claim 6, wherein each of said masking walls is arranged close to a peripheral portion of said corresponding intake valve, which is located on said exhaust valve means side and extends downward toward said piston to a position lower than said corresponding intake valve when said corresponding intake valve is in the maximum lift position thereof.

8. An internal combustion engine according to claim 7, wherein each of said masking walls extends in an arc along the peripheral portion of said corresponding intake valve.

9. An internal combustion engine according to claim 6, wherein said exhaust valve means comprises a pair of exhaust valves symmetrically arranged with respect to said vertical plane.

10. An internal combustion engine according to claim 1, wherein the top face of said piston and the inner wall of said cylinder head define a squish area therebetween on an opposite side of said depression.

11. An internal combustion engine according to claim 1, wherein said air blast valve comprises a nozzle opening arranged in the combination chamber, a valve body for controlling the opening operation of said nozzle bore, a pressurized air passage connecting said nozzle bore to a pressurized air source, and a fuel injector arranged in said pressurized air passage.

* * * * *